Jan. 22, 1963     J. J. RYAN ETAL     3,075,192
CODING APPARATUS FOR FLIGHT RECORDERS AND THE LIKE
Filed Dec. 21, 1959     5 Sheets-Sheet 1
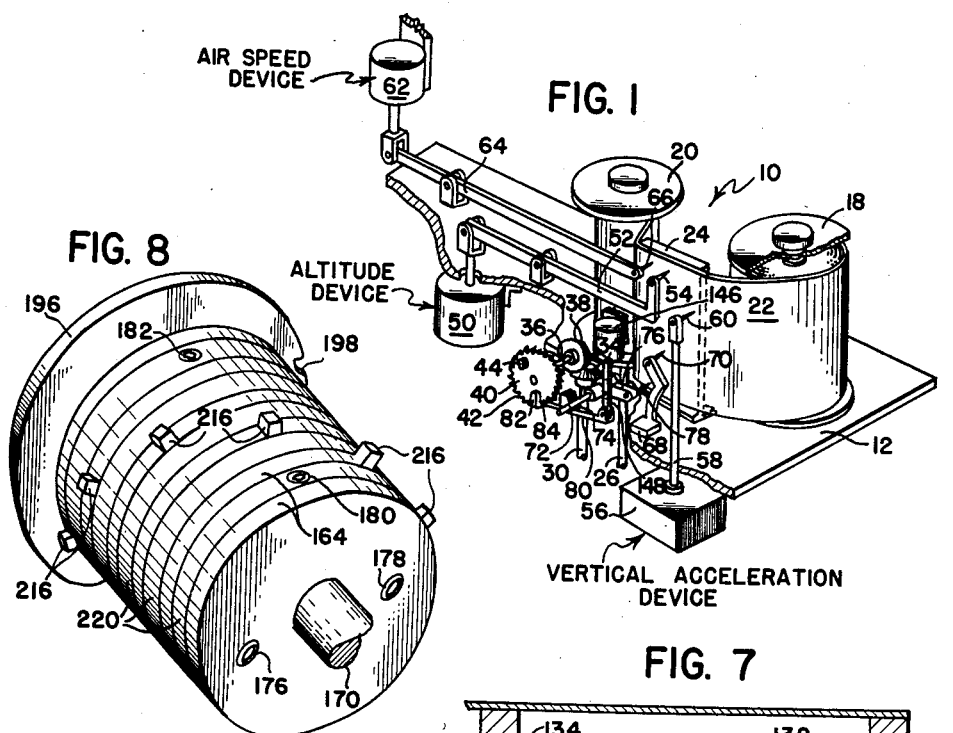
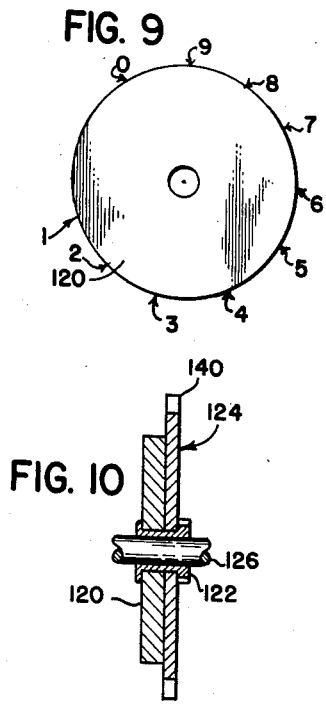
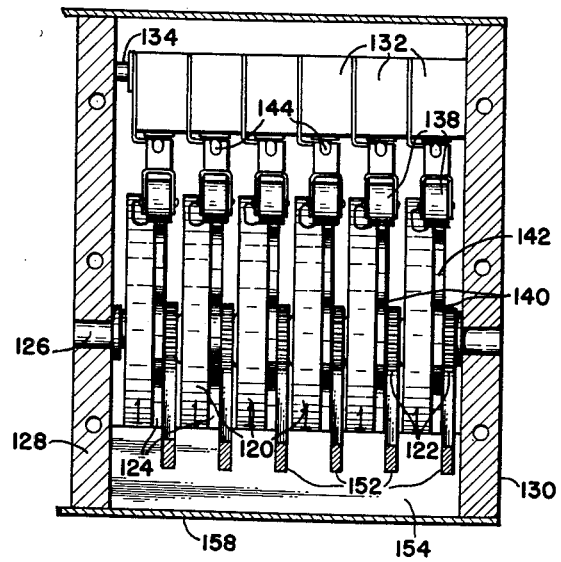
INVENTORS
KARL E. NEUMEIER
JAMES J. RYAN
BY
*Stuart R. Peterson*
ATTORNEY Jan. 22, 1963    J. J. RYAN ETAL    3,075,192
CODING APPARATUS FOR FLIGHT RECORDERS AND THE LIKE
Filed Dec. 21, 1959    5 Sheets-Sheet 2

FIG. 2

INVENTORS
KARL E. NEUMEIER
JAMES J. RYAN
BY
Stuart R. Peterson
ATTORNEY

Jan. 22, 1963  J. J. RYAN ETAL  3,075,192
CODING APPARATUS FOR FLIGHT RECORDERS AND THE LIKE
Filed Dec. 21, 1959  5 Sheets-Sheet 3

INVENTORS
KARL E. NEUMEIER
JAMES J. RYAN
BY
Stuart R. Peterson
ATTORNEY

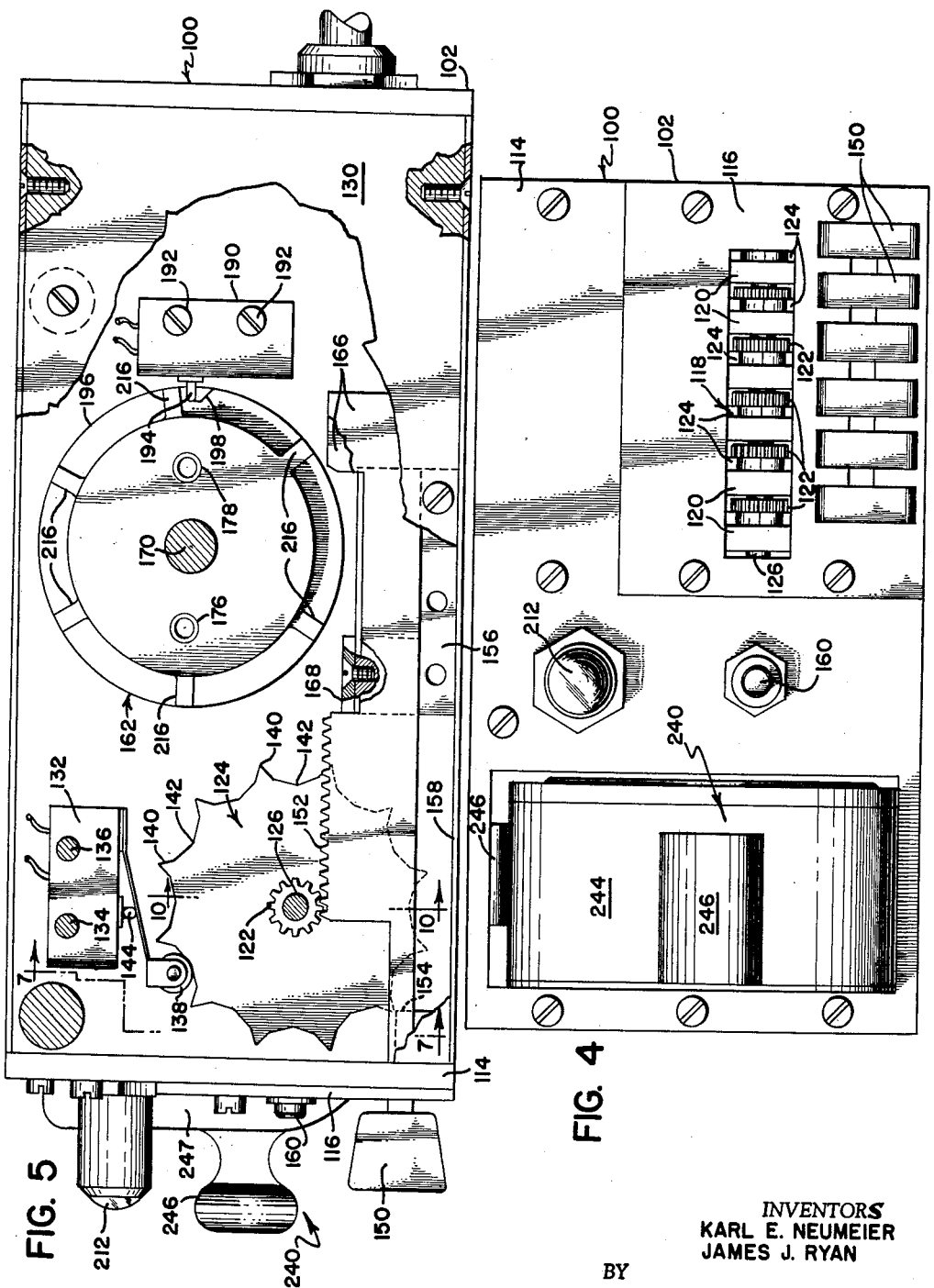

Jan. 22, 1963    J. J. RYAN ETAL    3,075,192
CODING APPARATUS FOR FLIGHT RECORDERS AND THE LIKE
Filed Dec. 21, 1959    5 Sheets-Sheet 5

INVENTORS
KARL E. NEUMEIER
JAMES J. RYAN
BY
*Stuart R. Peterson*
ATTORNEY

United States Patent Office 3,075,192
Patented Jan. 22, 1963

3,075,192
CODING APPARATUS FOR FLIGHT RECORDERS AND THE LIKE
James J. Ryan, St. Paul, and Karl E. Neumeier, Stillwater, Minn., assignors to General Mills, Inc., a corporation of Delaware
Filed Dec. 21, 1959, Ser. No. 860,803
13 Claims. (Cl. 346—23)

This invention relates generally to recording devices and pertains more particularly to apparatus for encoding identifying information on the chart or recording of a flight recorder.

Flight recorders have been devised for use on aircraft for the purposes of recording data relating to altitude, air speed, vertical acceleration, direction of flight, time, and the like. The recorded data is usually marked on a permanent record such as a metallic foil so that the record will withstand crash conditions of the aircraft on which such a recording device has been installed.

The object of the present invention is to provide coding apparatus which can be selectively operated by the pilot of the aircraft so as to mark identifying information on the record of a flight recorder. More specifically, it is an aim of the invention to provide apparatus of the envisaged character which is capable of recording both the flight number and the date of the flight.

Another object of the invention is to provide coding apparatus which will assure that the proper identifying data is recorded on the record. Stated somewhat differently, the invention provides a mechanism that resets itself automatically after the apparatus has been initially manipulated into the position corresponding with the information to be recorded, the apparatus performing its recording task during the resetting movement.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a schematic perspective diagram of certain elements constituting a flight recorder with which our coding apparatus can be employed;

FIG. 2 is primarily an electrical schematic diagram depicting the electrical features of our coding apparatus, the view also including a mechanical schematic portion of the flight recorder pictured in FIG. 1;

FIG. 4 is a front elevational view of the coding apparatus itself;

FIG. 5 is an elevational view in section taken generally along the line 5—5 of FIG. 6;

FIG. 7 is an elevational sectional view taken along the line 7—7 of FIG. 5, the view depicting a plurality of indicating dials in association with certain switches that are actuated in accordance with the rotative position of such dials;

FIG. 8 is a perspective view of a sequential cam assembly employed in our apparatus;

FIG. 9 is a side view of one of the indicating dials for the purpose of showing the relative locations of the characters or numbers thereon; and, FIG. 10 is an elevational sectional view taken in the direction of line 10—10 of FIG. 5 for the purpose of depicting an indicating dial and the switch assembly associated therewith.

Figure 3:
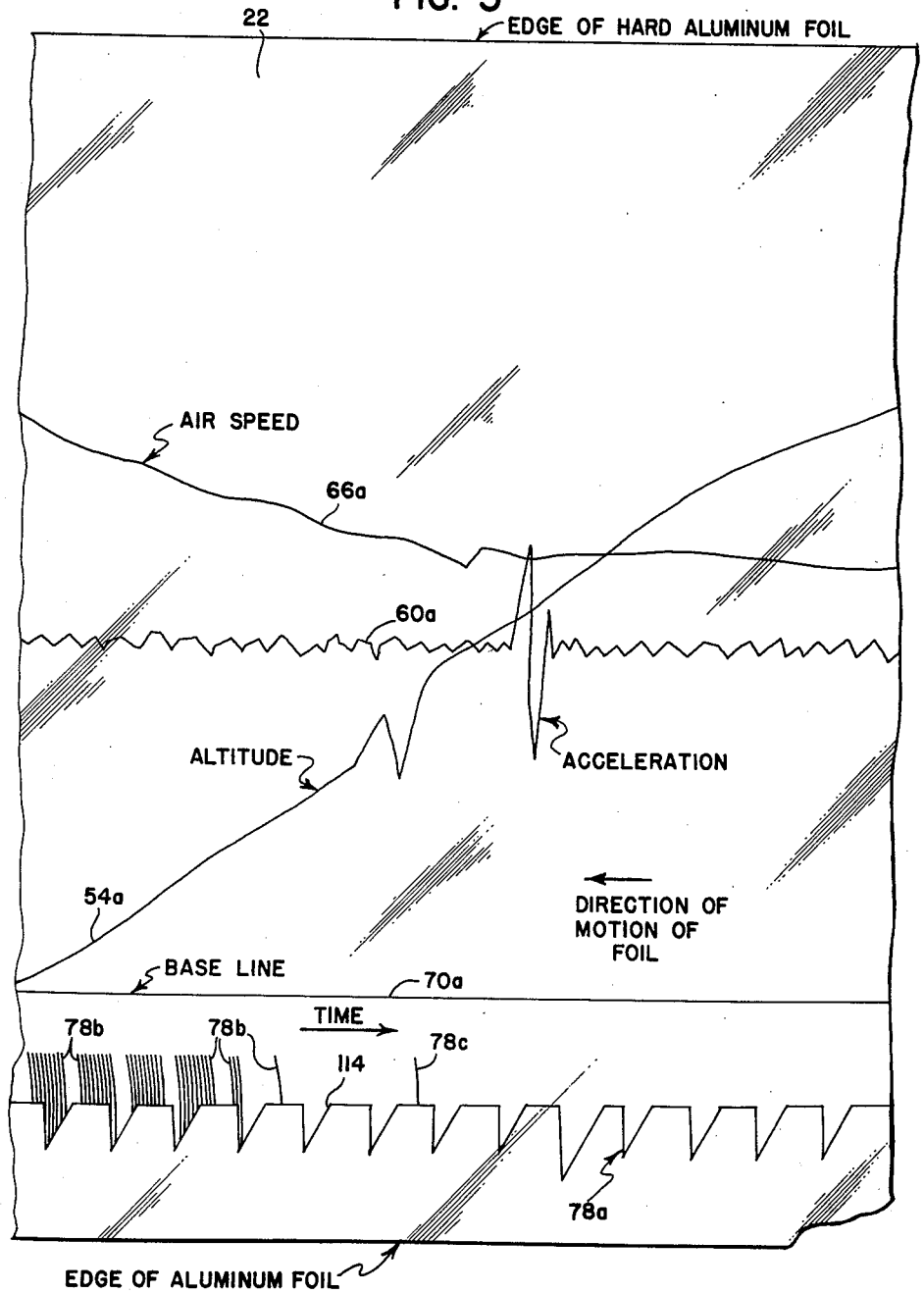
FIG. 3 is an enlarged view of a typical portion of a metallic record that has embossed thereon flight data together with the coded information identifying such flight.

Before describing the coding apparatus itself it will be helpful to refer generally to an exemplary flight recorder. Accordingly, attention is now directed to FIG. 1 and the right hand portion of FIG. 2. The flight recorder that has been selected as an illustration is designated generally by the reference numeral 10. The flight recorder includes in this instance a plate support 12 having mounted thereon an electrical motor 14 (FIG. 2). The motor 14 is drivingly connected to a downwardly extending shaft 16 which passes through the support 12. A tape supply spool or container 18 and a take-up spool 20 are supported in spaced relationship on the upper surface of the support 12 and a metallic recording medium 22, such as a tape or strip of aluminum foil, extends from the supply spool 18 to the take-up spool 20 across a platen 24 adjustably connected to the support 12 intermediate the spools 18, 20.

Still referring to FIGS. 1 and 2, and more particularly the latter figure, it will be observed that a shaft 26, keyed at its upper end to the take-up spool 20 and provided at its lower end with a gear 28, is rotatably supported in the plate or support 12. A second shaft 30 provided at its lower end with a gear 32 enmeshed with the gear 28 and at its upper end with a beveled gear 34 is rotatably supported in the plate or support 12. The shaft 30 is coupled to a third shaft 36 via a beveled gear 38. The shaft 36 carries intermediate its ends a timing wheel 40 having a plurality of equally spaced teeth 42 uniformly distributed about its periphery. The timing wheel 40 also carries a cam 44 located on one face thereof. The shaft 36 is attached at the end thereof opposite the beveled gear 38 to a known type of clock escapement mechanism denoted by the numeral 49. However, it may be explained that the escapement comprises the usual train of gears, pallet, balance wheel and balance wheel spring, commonly found in ordinary clock escapements. More will be said later on concerning the role played by the timing wheel 40.

Continuing with the description of the flight recorder 10, it will be observed that the gear 28 meshes with, and is driven by a gear 46, the gear 46 in turn being driven by the motor shaft 16 through the medium of a pinion gear 48 carried by said shaft. The described connection to the take-up spool 20 and to the clock escapement 49 serve to stall the motor 14, the motor in turn exerting a steady operating torque on the take-up spool 20 and the clock escapement 49.

For the sake of simplifying the drawings as much as possible the various gears shown in FIG. 2 are not depicted in FIG. 1. By the same token certain mechanism pictured in FIG. 1 is not illustrated in FIG. 2. This will now be evident from the additional details to be given in conjunction with the flight recorder 10. In this regard specific reference should now be made to FIG. 1 wherein an altitude device 50, which is of the aneroid type, is set forth. It is through the agency of linkage designated by the numeral 52 that a stylus 54 is moved so as to scribe or emboss data pertaining to the altitude of the aircraft during flight. Inasmuch as it is usually desired that vertical acceleration be recorded, a vertical acceleration device 56 is included in the flight recording device. Through the agency of simple linkage 58, a stylus 60 can be made to bear upon the chart or record 22 in a manner generally similar to that in which the stylus 54 acts. Still further, in order to record air speed an air speed device 62 is utilized and its movement is transmitted via linkage 64 to a stylus 66. For the purpose of providing a base line on the record 22, a fixed bracket 68 is suitably located so that a stylus 70 mounted thereon will constantly press against the record 22 so that a reference line is located upon said record. Such line is quite helpful in analyzing the flight data that is generally recorded on said record 22. In calibrating the record and transposing the graphic lines, readings are made relative to the reference or base line produced by the stylus 70.

Having already referred to the timing wheel 40 and the escapement 46 associated therewith, further mechanism can now be described with greater clarity. As shown in the right hand portion of FIG. 1, a shaft 72 is rotatably supported on the support 12 in a bearing block 74, the shaft 72 having at one end a transverse arm 76 which carries a stylus 78 for the purpose of marking the record 22 with a series of time marks 78a. The arm 76 is biased in a clockwise direction, as viewed in FIG. 2, by a coil spring 77. The end of the shaft 72 opposite the stylus 78 is connected to one leg of an L-shaped transverse arm 80, the other leg of said arm being provided at its free end with two cam surfaces 82 and 84. The cam surface 82 is positioned so as to be engaged with the cam 44 on the timing wheel 40 and the cam surface 84 is located so as to be engageable by the various teeth 42 spaced peripherally around the timing wheel 40.

It will undoubtedly be of some help to refer at this time to FIG. 3 where an enlarged portion of the record 22 having flight data embossed thereon is set forth. It will be recalled that an altitude device 50 is employed in the recording of flight data and the mark or line made by its stylus 54 has been indicated in this figure by the numeral 54a. Similarly, the acceleration that has been recorded through the agency of the stylus 60 has been labelled 60a. The air speed data bears the reference numeral 66a, it having been recorded via the stylus 66 and the movement derived from the air speed device 62. The base or reference line has been designated by the numeral 70a. Although more will be said hereinafter concerning the timing marks scribed by the stylus 78, nonetheless typical timing marks have been denoted by the reference numeral 78a. It might be mentioned that these marks can be representative of any given interval of time, and therefore no specific interval need be mentioned.

Figure 6:
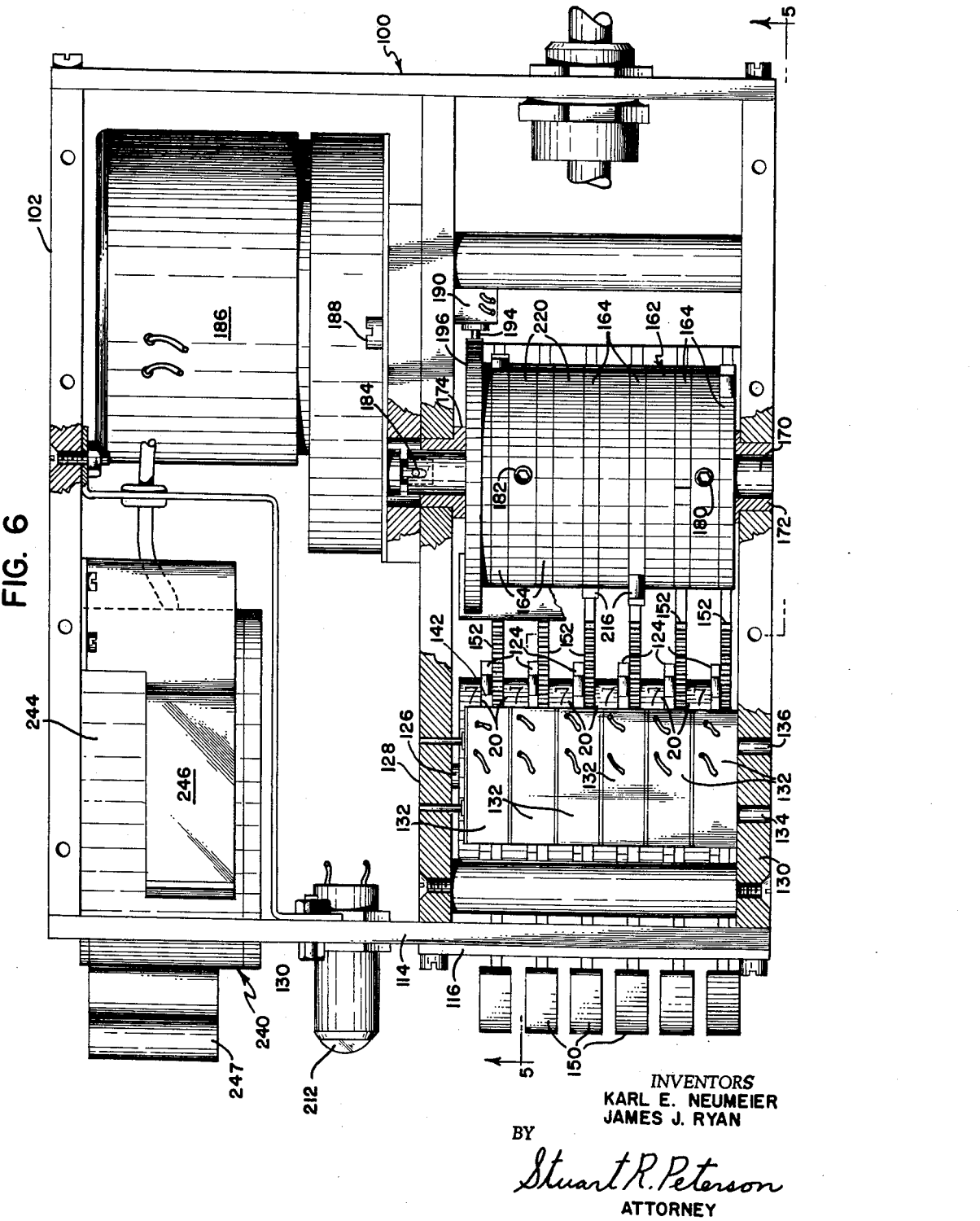
FIG. 6 is a plan view of the coding apparatus with its cover plate removed.

Having generally described a typical flight recorder 10 with which our invention may be employed, it is thought that the coding apparatus now to be referred to will be readily understood. Therefore, the reference numeral 100 has been used to represent in its entirety this apparatus. As shown in FIGS. 4, 5 and 6, the apparatus 100 includes a generally rectangular housing 102 provided with a panel or front plate 114 to which is secured a selector plate 116. The selector plate 116 is provided with an opening or window 118 through which a series of indicating wheels or dials 120 may be observed.

Each of the wheels 120 has integral therewith a pinion 122 and a switch actuating cam 124, and is rotatably mounted on a horizontal shaft 126, the ends of which are supported in vertical side plates 128 and 130, as shown in FIG. 7. Six indicating wheels 120 are positioned on the shaft 126 in such manner that the switching cams 124 are in immediate alignment with rollers 138 of attendant electrical switches 132, preferably of the segmental or wiping variety but for the sake of simplicity pictured as being of the microswitch type. The switches 132 are supported in a fixed position immediately above the cams 124 by a pair of shafts 134 and 136 which are also journaled at their ends in the side plates 128 and 130. The switching cams 124 are relatively larger in diameter than the number wheels 120 and are provided with a series of twelve raised portions or pointed promontories 140 at 30 degree increments spaced around their extreme outer diameter. Intermediate each of the raised portions 140 extending inwardly to a lesser diameter is a V-shaped notch 142. The rollers 138 of the switches 132 rest in the notches 142 when the cams 124 are stationary and ride over from one to ten of the raised portions 140 when the cams 124 are rotated. Each time the rollers 138 ride over the raised portions 140 they depress plungers 144 belonging to the switches 132 to complete a circuit and energize an electromagnet 146 (best viewed in FIG. 2) when the coding apparatus 100 is used. In the exemplary embodiment of the coding apparatus 100 the electromagnet 146 includes a movable armature 148 articulatively connected to an extension of the transverse arm 80. When the electromagnet 146 is energized in a manner hereinafter made manifest, the transverse arm 80 is swung or rotated counterclockwise, such action overcoming the bias provided by the spring 77. Consequently, each time the electromagnet 146 is energized the time marks 78a will be mutilated so as to provide a plurality of discrete blips 78b. These blips 78b are grouped so as to provide an intelligible code indicative of the date and flight number as will be presently explained. While one feature of the instant invention resides in the dual utilization of the stylus 78 for making both the time marks 78a and the identifying blips 78b, it will be understood that if circumstances so dictate a separate stylus could be used for embossing the blips 78b, the separate stylus then being actuated by the electromagnet 146.

At this point it is to be realized that each of the indicating wheels 120, its associated pinion 122, and switching cam 124 is independently rotatable about the shaft 126 as an integral unit with respect to the adjacent number wheels. By having the wheels 120 so mounted, a pilot can manipulate a series of selector knobs 150 to position a selected number in the window 118 of the selector plate 116. As will be noted particularly in FIG. 4, the selector knobs 150 are positioned directly beneath the window 118, one for each of the corresponding indicating wheels 120. Thus a pilot can individually position each wheel 120 until a selected indicating mark or number appears in the window 118. For example, we have provided six of the wheels 120, four of which, reading from left to right, allow for a four digit flight number, the latter two number wheels 120 being used to indicate the date of the month.

Employing a theoretical flight number such as "9999," and a theoretical date such as the 31st day of the month, it can be seen that a pilot can manipulate the selector knobs 150 until these numbers appear in their proper sequence in the window 118. Under certain conditions, such as during wartime, the numerals may be transplated by a corresponding code or other suitable indicating marks.

Referring now to the manner in which the indicating wheels 120 are moved into position, the selector knobs 150 are secured to slidably mounted pinion racks 152 positioned transversely to the shaft 126 within the coding device 100. The pinion racks 152 are engaged by the pinions 122, and are guided in their sliding movement by front and rear guide racks 154 and 156 which are supported on the bottom plate 158 of the housing 102. When the selector knobs 150 are pulled outwardly the pinion racks 152 rotate the pinions 122, the indicating wheels 120, and the switching cams 124 clockwise to position a desired series of indicating numbers in the window 118.

Referring momentarily to the indicating wheels 120 and their associated switching cams 124 as seen in FIGS. 9 and 10, each of the wheels 120 in the present instance is provided with a set of numerals "zero" through "nine" which are equally spaced apart with the exception of the segment between "one" and "zero" (see FIG. 9) and are positioned counterclockwise around the circumference of the wheels 120. The numerals are positioned such that they are in general alignment with the V notches 142 of switching cams 124. This has particular significance in that one of the raised portions 140 appears in relative position between each of the numbers. As the number is indexed by the rotation of the pinion 122 the roller 138 depresses the plunger 144 of the switch 132 associated therewith by riding over the raised portion 140 of the switching cam 124. Thus a number such as "9" appearing on a particular wheel 120 in the window 118 will have caused the plunger 144 to be actuated nine times by the roller 138 riding over the raised portions 140 when the selector knob 150 is pulled outwardly. Likewise when the indicating wheel 120 is rotated in the opposite direction as will next be described, the plunger 144 is again depressed each time the roller 138 rides over the raised portions 140. Having mentioned the presence of twelve raised portions 140 (which of course produce twelve notches 142), it should perhaps be explained that only ten are actually utilized in order to leave an unnumbered segment between the "1" and "0" which segment normally appears in the window 118. The switching cams 124 are rotated through a maximum angle of 300 degrees so that the two extra portions 140 on each cam never actuate the switches 132.

In the first instance during the selection of the numbers by the pilot, the switches 132 are not energized and the actuation of the plungers 144 does not effect the operation of the coding device 100. However, when the pilot has made his selection, he presses the switch labelled 160 in FIG. 2 to actuate a motor driven cam assembly 162. The individual cams 164 on the cam assembly 162 engage upright portions 166 on the sliding pinion racks 152 to return them to their reset position against a fixed stop 168. As the pinion racks 152 are returned to their reset position the pinions 122 are rotated counterclockwise and the integral switching cams 124 and number wheels 120 are moved therewith to their reset position, this position being governed by the travel of each pinion rack 152.

The cam assembly 162 is secured to a horizontal shaft 170 which is rotatably mounted in suitable bearings 172 and 174 in the side plates 128 and 130 and is provided with pins 176 and 178 which extend therethrough and are peened over at their ends to secure the assembly into an integral unit. A pair of set screws 180 and 182 are also provided and secure the cam assembly 162 to the shaft 170. The shaft 170 is connected by a cross-pin type coupling 184 to a suitable drive motor 186 which is secured to the side plate 128 by screws 188. The motor 186 is connected into the electrical circuit of FIG. 2 and is started by the pilot when he closes switch 160. The motor 186 drives through the coupling 184 to rotate the cam assembly 162 one complete revolution at which time the circuit is broken by a switch 190 operating in conjunction with the cam assembly 162.

The switch 190 is secured to the side plate 128 by screws 192, and is provided with a plunger 194 in contact with a circular plate 196 on the cam assembly 162. The circular plate 196 is provided with a notch 198 into which the plunger 194 projects when the cam assembly 162 is in its normal or reset position as shown in FIG. 5. When the cam assembly 162 is rotated, the plunger 194 rides out of the notch 198 and is depressed by the outer diameter of the plate 196 to energize the switch 190 so long as the cam assembly 162 is rotated. However, upon the completion of one revolution of the cam assembly 162, the plunger 194 again snaps into the notch 198 and the switch 190 is de-energized.

The utility of the switch 190 can be best understood in conjunction with the electrical circuit of FIG. 2. The switch 190 is a normally open switch and is connected by conductor 200 to another conductor 202 leading to one side of the aircraft's electrical system. The start switch 160 is also connected to the conductor 202 and is connected by conductor 204 to the motor 186. The switch 160 is a make-break switch and when energized starts the motor 186 which is connected by a conductor 206 to a conductor 208 leading to the other side of the craft's electrical system. Instantly the plunger 194 rides out of the notch 198 as the cam assembly 162 is rotated, and is depressed by the circular plate 196 completing a circuit through conductor 210 to the conductor 204 of motor 186.

As the plunger 194 is depressed, a circuit is completed to an indicator light 212 which is connected by a conductor 214 to conductor 210 which is connected to switch 190. The indicator light 212 burns continuously while the switch 190 is energized and indicates to the pilot that the motor 186 is in operation. Once the indicator light 212 is on, the pilot releases the make-break switch 160 and the motor 186 continues to operate until the plunger 194 snaps into the notch 198 of the circular plate 196.

Referring now in more detail to the cam assembly 162 and its operation in conjunction with the circuit of FIG. 2, the individual cams 164 are identical in construction, being relatively flat, circumferential discs provided with radially extending tabs 216. Six of the cams 164 are employed in the assembly 162, and are spaced apart along the axis of shaft 170 by spacers 220. The cams 164 are positioned on the shaft 170, with each tab 216 approximately 48 degrees removed from a line tab 216 on the adjacent cam, and with each tab 216 being adapted to act upon one of the upright portions 166 on the pinion racks 152 when the cam assembly 162 is rotated. By positioning the cams 164 as described above, each tab 216 acts upon the upright portion 166 of a particular pinion rack 152 independently of, and in timed relation to, the adjacent tabs 216 of the succeeding cams 164. The relative positioning of the tabs 61, and their sequence of engagement with the upright portions 166 is such that the tab 216 of the cam 164 nearest the circular plate 196 is the first to engage the upright portion 166 of the pinion rack 152 which is in alignment therewith. Likewise each succeeding tab 216 acts upon the upright portion 166 of the pinion rack 152 in alignment therewith just after the preceding tab 216 is clearing the upright portion 166 of its respective pinion rack 152. In this manner a time interval is established between each succeeding tab 216. Thus, as each pinion rack 152 is returned to its reset position against the stop 168, the indicating wheel or dial 120 and its switching cam 124 are rotated by their integral pinion 122 to return them to their normal or reset position.

Once the switch 190 is closed by the rotation of the cam assembly 162, the circuit of FIG. 2 is then in condition such, that when each switch 132 is energized by the portions 140 of the switching cams 124, a circuit is completed through conductors 220 and 222 to the electromagnet 146 of the flight recorder 10. Thus during rotation each switching cam 164 effectuates the depression of the plunger 144 a number of times depending upon the selected setting of its respective indicating wheel 120 and likewise the electromagnet 146 is energized accordingly.

As already pointed out, the energization of the electromagnet 146 is responsible for producing the blips 78b. The respective groupings of these blips can now be more readily understood. It will be recalled that we selected the 31st day of the month. Therefore, the two right hand dials 120 would be set at this number, whereas the four lefthand dials would be set to read "9999." Consequently, when the pilot thereafter closes the switch 160, the motor 186 rotates the cam assembly 162 so that the first angularly oriented tab 216 approaches its lowermost position as viewed in FIG. 5 with the concomitant engagement with the upright portion 166 carried by the first rack 152. The cam assembly 162 is rotated in a counterclockwise direction so the first tab 216 returns the first rack 152 to its reset position. During this happening the particular switch 132 activated by the cam 124 is closed and opened nine times, since this cam is intended to produce the first "9" in "9999." At the end of the recording period only one switch closure is effected because in bringing the "1" on the right hand dial 120 (FIG. 7) into registry with the window 118 the pilot pulled the knob 146 only a relatively small distance away from the front plate 114. It will be recalled that each tab 216 is capable of actuating an upright portion 166 over 48 degrees of travel, leaving a remaining 12 degrees of travel where it is never in engagement with its associated upright portion 166. This assures a spacing between groups of blips 78b even when "9's" are to be recorded. Thus in producing a "9" the particular tab 216 will move very little before engaging the upright portion 166 associated therewith, but almost the full 48 degrees in producing a "1."

From the preceding explanation it can now be seen that the next adjacent rack 152 will cause angular movement of the next switch actuating cam 124, so that three of its raised portions 140 close the switch 132 associated therewith three times, thereby recording the "3" in "31." Similarly, the succeeding cam 164 owing to the setting of its dial 120, records the units digit "9" of the flight number 9999. Then the next cam 124 is rotated, and so on until the four groups of blips 78b are recorded all as indicated in FIG. 3, through the respective mutilations of the time marks 78a. The motor 186, of course, rotates the cam assembly through 360 degrees or one revolution in returning all six racks 152 to this reset or initial position against the stop 168. The motor 186 is automatically de-energized at this time for its switch 190 opens when the notch 198 moves into registry with the plunger 194. Actually, the embossing of the flight identifying information, that is, the production of the blips 78b, takes place in a relatively short interval of time— in fact so short that a magnifying glass will normally have to be employed to read what has been recorded. However, in FIG. 3 the blips 78b have been spaced sufficiently so as to make them more readily discernible.

Although it is believed obvious, it might be specifically pointed out that the electromagnet 146 always deflects or shifts the arm 80 to the same terminating point, thereby shifting the stylus 78 to the same extent. However, the point at which the deflection starts is determined by where the cam surface 84 happens to be riding on a particular tooth 44 belonging to the timing wheel 42.

Often times specific events and other phenomena occur which cannot be fed into the flight recorder 10 and are therefore not made of record. For example, unexpected weather conditions can conceivably weaken the structural design of the aircraft, and in such an instance only the immediate flight personnel would possess knowledge of this fact. Provision is therefore made for including an event marking device by which a pilot can, at his discretion, feed into the coding device 100 information which he feels should be made of record.

The event marker indicated generally by the numeral 230 in FIG. 2 consists of a make-break switch 232 connected by a conductor 234 and the conductor 202 to the aircraft's electrical system, and by a conductor 236 to the previously mentioned conductor 220. By utilizing any predetermined code, the pilot can by closing, and releasing the switch 232 energize the electromagnet 146 causing the stylus 78 to provide a special blip 78c on the recording foil 22. By manipulating the switch 232 the pilot can cause the blip 78c plus others to be commensurate with the desired pre-established code and therefore, can, at will, feed information into the flight recorder 10.

In order to check operation of the recorder, i.e.; to assure that the recorder is running we provide a carbon-granule type sound powered phone 240. The pick up 242 of the sound powered phone 240 is positioned adjacent to the escapement 49 and the receiver designated 244 is retained in the coding device 100 by a leaf spring 246 which bears against its top surface as seen in FIG. 6. The pilot places the receiver 244 to his ear, grasping its handle 247, and when finished he replaces it beneath the spring 246.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Now therefore we claim:

1. In a flight recorder having a record upon which certain flight data is to be recorded and means for moving said record in one direction while said flight data is being recorded, coding apparatus comprising a stylus mounted so that said record is moved relative thereto when moved in its said one direction, means for shifting said stylus with respect to said one direction to make a detectable mark on said record, and selective cam means movable into a plurality of positions for causing actuation of said shifting means a desired number of times in accordance with the particular position into which said selective cam means has been moved to provide a recorded code consisting of a number of marks capable of identifying said record.

2. In a flight recorder having a record upon which certain flight data is to be recorded and means for moving said record in one direction while said flight data is being recorded, coding apparatus comprising a stylus mounted so that said record is moved relative thereto when moved in its said one direction, means for shifting said stylus with respect to said one direction to make a detectable mark on said record, a plurality of manually settable elements movable between reset positions and other relative positions each of which positions is representative of identifying information to be recorded, motor means for successively returning said elements to their reset positions, and means responsive to the resetting movement of said elements for causing actuation of said shifting means a desired number of times in accordance with a particular previously set position to provide a recorded code consisting of a number of marks capable of identifying said record.

3. The construction set forth in claim 2 including means for grouping said marks so that those derived from each element are distinguishable from each other.

4. In a flight recorder having a record upon which certain flight data is to be recorded and means for moving said record in one direction while said flight data is being recorded, coding apparatus comprising a stylus mounted so that said record is moved relative thereto when moved in its said one direction, electromagnetic means for shifting said stylus with respect to said one direction to make a detectable mark on said record, switch means for energizing said electromagnetic means, and manually adjustable selective means for actuating said switch means a desired number of times to energize said electromagnetic means a corresponding number of times in accordance with the degree of adjustment of said selective means to provide an identifying code on said record.

5. The construction set forth in claim 4 in which said selective means includes a plurality of individually rotatable dials, motor means for resetting said dials in succession, and a cam associated with each dial, each cam having a sufficient number of raised portions for actuating said switch means a desired number of times in accordance with the angular setting of each dial by said selective means.

6. The construction set forth in claim 4 including additional switch means actuatable by the pilot for energizing said electromagnetic means to produce an event mark at a selected time on said record.

7. In a flight recorder having a record upon which certain flight data is to be recorded and means for moving said record in one direction while said flight data is being recorded, coding apparatus comprising a stylus mounted so that said record is moved relative thereto when moved in its said one direction, means for displacing said stylus transversely with respect to said one direction to make a distinguishable mark on said record, and manually movable selective cam means for causing actuation of said displacing means a prescribed number of times in accordance with the degree of movement of said selective cam means to produce a corresponding number of marks on said record in accordance with information that has been selected for identifying said record.

8. In a flight recorder having a record upon which certain flight data is to be recorded, means for moving said record in one direction while said flight data is being recorded, a stylus in engagement with said record and means for periodically displacing said stylus transversely with respect to said one direction to make a plurality of successive time marks, coding apparatus comprising manually settable cam means indicative of information that has been selected for identifying said record and means controlled by said manually settable cam means for causing a noticeable increase in the displacement of said stylus a desired number of times to provide a recorded code consisting of a number of marks determined by the setting of said manually settable cam means capable of identifying said record which last-mentioned marks are distinguishable from said time marks due to the increased displacement of said stylus.

9. In a flight recorder having a record upon which certain flight data is to be recorded and having means for moving said record in one direction while said flight data is being recorded, coding apparatus comprising a shaft, a plurality of indicating wheels mounted for individual rotation about said shaft, said wheels being provided with various characters spaced apart around the circumference thereof, a pinion integral with each wheel, a gear rack in mesh with each pinion and manually slidable between a reset position and a selected extended position to rotate the wheel associated therewith into a preferred angular position on said shaft which preferred position is indicative of identifying information to be encoded on said record, cam means mounted adjacent said racks having axially and angularly spaced projections for successively acting upon the racks to return said racks to their reset positions, a motor for operating said cam means, a stylus mounted so that said record is moved relative thereto when moved in its said one direction, an electromagnet for shifting said stylus with respect to said one direction to make a detectable mark on said record, switch means in circuit with said electromagnet, a switch actuating cam integral with each indicating wheel having a plurality of projections thereon, there being one for each character, said last-mentioned projections being engageable with said switch means to cause operation thereof and concomitant energization of said electromagnet when said motor operates to return successively said racks to their reset positions.

10. The construction set forth in claim 9 wherein said last-mentioned projections occupy a relative position between each of the characters of said indicating wheels, said last-mentioned projections being adapted to actuate said switch means in accordance with the character setting of said indicating wheel, when said pinion racks are returned to a reset position.

11. Coding apparatus for a flight recorder comprising a first means provided with a plurality of indications thereon, said first means selectively movable between an indicating and a non-indicating position, a second means movable between an extended and a reset position and adapted to be manually actuated to move said first means to an indicating position, a motor driven cam means having a projection thereon adapted to return said second means to said reset position, an electrical circuit including a switching means operatively connected to an electromagnet employed in conjunction with a flight recorder, said electromagnet provided with stylus means for engaging the record of said flight recorder, and a third means integral with said first means and provided with actuating means for actuating said switching means in correlation to the selective setting of said first means, said actuation energizing said magnetic means shifting said stylus means with respect to said record whereby said selective setting is encoded thereon.

12. Coding apparatus for a flight recorder comprising a plurality of indicating wheels provided with indicia spaced apart around the circumference thereof, each of said wheels being provided with an integral pinion and a switching cam provided with a plurality of switch actuating portions, said wheels being mounted for individual rotation about a supporting shaft with each of said pinions engaging a pinion rack, said pinion rack being slidably mounted transversely to said supporting shaft and adapted to be manually actuated to move said wheels and said indicia to a select position, an upright portion on one end of each of said pinion racks, a motor driven cam assembly adjacent said upright portions provided with axially and angularly disposed projections adapted to act successively upon said upright portions, an electrical circuit connected to a flight recorder containing a movable record, electromagnetic means in said circuit provided with a stylus for engaging the record of the flight recorder, a first switching means in said circuit adapted to be manually actuated to energize momentarily said motor, a second switching means in said circuit actuated by said cam assembly and adapted to maintain said actuation during the rotation of said cam assembly after the release of said first switching means, and a third switching means actuated by the actuating portions of said switching cams in response to the selected setting of said indicia whereby the electromagnetic means is energized to encode on the record of the flight recorder a series of indicating marks indicative of said selective setting.

13. The construction set forth in claim 12 wherein said cam assembly is provided with means for de-energizing said second switching means when said pinion racks are returned to a reset position, said means being adapted to again energize said second means upon the actuation of said first means.

References Cited in the file of this patent
UNITED STATES PATENTS

| 2,074,754 | Murphy | Mar. 23, 1937 |
| 2,669,500 | Och et al. | Feb. 16, 1954 |
| 2,678,867 | Rasmussen | May 18, 1954 |
| 2,991,142 | Zimmerman | July 4, 1961 |

FOREIGN PATENTS

| 543,078 | Belgium | Dec. 15, 1955 |

OTHER REFERENCES

Control Engineering, pages 127, 129, 131, April 1958.